United States Patent
Asai

(10) Patent No.: US 11,824,689 B2
(45) Date of Patent: Nov. 21, 2023

(54) COMMUNICATION APPARATUS AND METHOD FOR CONTROLLING THE SAME

(71) Applicant: CANON KABUSHIKI KAISHA, Tokyo (JP)

(72) Inventor: Hitoshi Asai, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/746,792

(22) Filed: May 17, 2022

(65) Prior Publication Data
US 2022/0407744 A1    Dec. 22, 2022

(30) Foreign Application Priority Data

Jun. 17, 2021  (JP) .............................. JP2021-100734

(51) Int. Cl.
*H04L 25/02*  (2006.01)
*H04L 25/05*  (2006.01)

(52) U.S. Cl.
CPC ...... *H04L 25/0222* (2013.01); *H04L 25/0272* (2013.01); *H04L 25/05* (2013.01)

(58) Field of Classification Search
CPC .............. H04B 5/0031; H04L 25/0222; H04L 25/0272; H04L 25/05
See application file for complete search history.

(56) References Cited

U.S. PATENT DOCUMENTS

| 2014/0073243 | A1* | 3/2014 | Hijioka | ............... | H04B 5/0037 |
| | | | | | 455/41.1 |
| 2016/0020826 | A1* | 1/2016 | Fujii | ....................... | H04B 3/00 |
| | | | | | 375/257 |
| 2017/0288731 | A1* | 10/2017 | Kerselaers | .......... | H04B 13/005 |
| 2022/0158691 | A1* | 5/2022 | Eguchi | ................. | H04B 5/0031 |

FOREIGN PATENT DOCUMENTS

JP    2016029785 A    3/2016

* cited by examiner

*Primary Examiner* — Nader Bolourchi
(74) *Attorney, Agent, or Firm* — Canon U.S.A., Inc. IP Division

(57) ABSTRACT

A communication apparatus configured to contactlessly communicate a baseband signal to another communication apparatus includes a transmission unit configured to stop output of a transmission signal, which is to be transmitted to the other communication apparatus, while a reception intensity of a reception signal received from the other communication apparatus is lower than a first threshold value, and a transmission coupler configured to be coupled to a reception coupler of the other communication apparatus by electric field coupling.

12 Claims, 10 Drawing Sheets

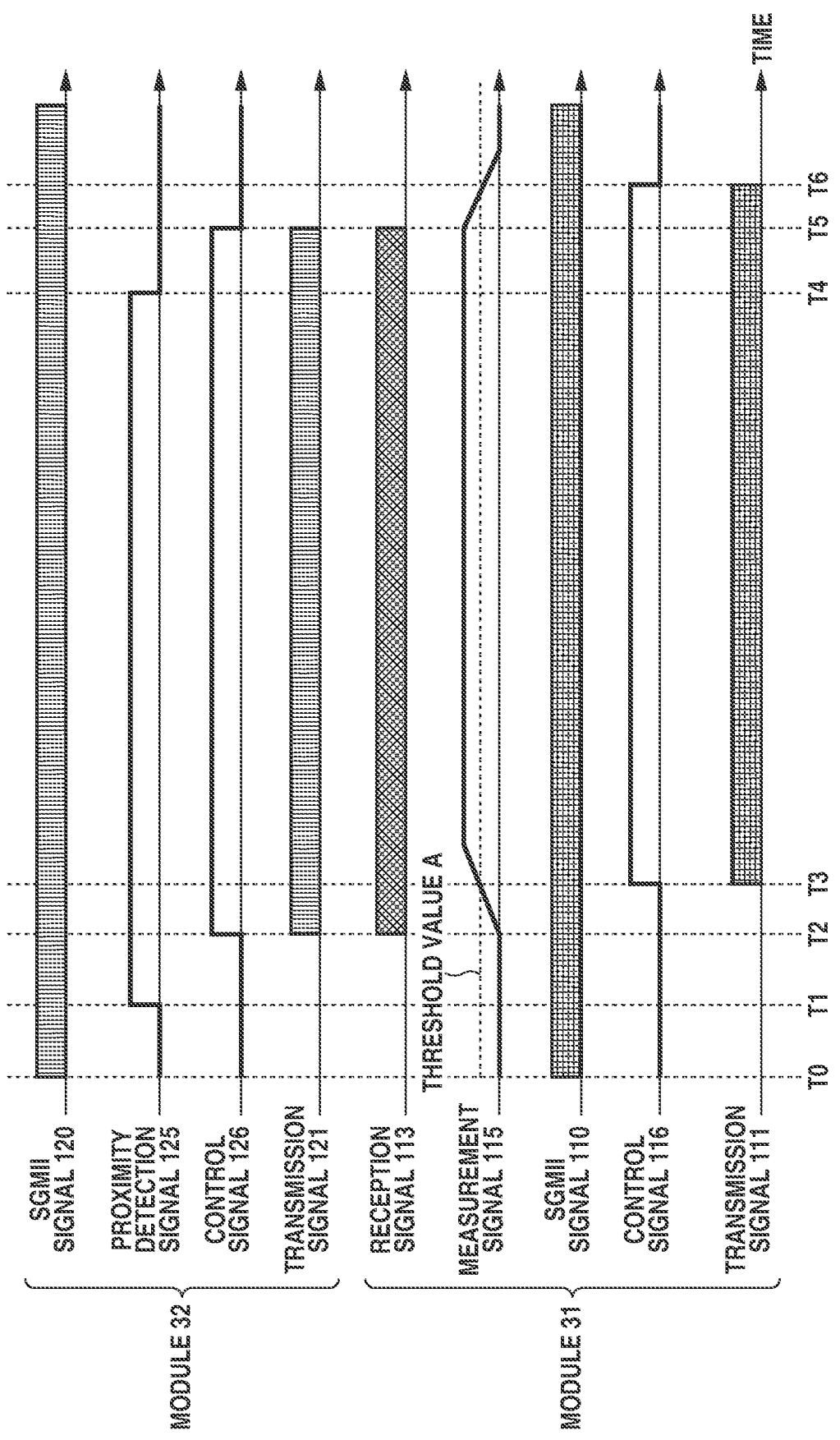

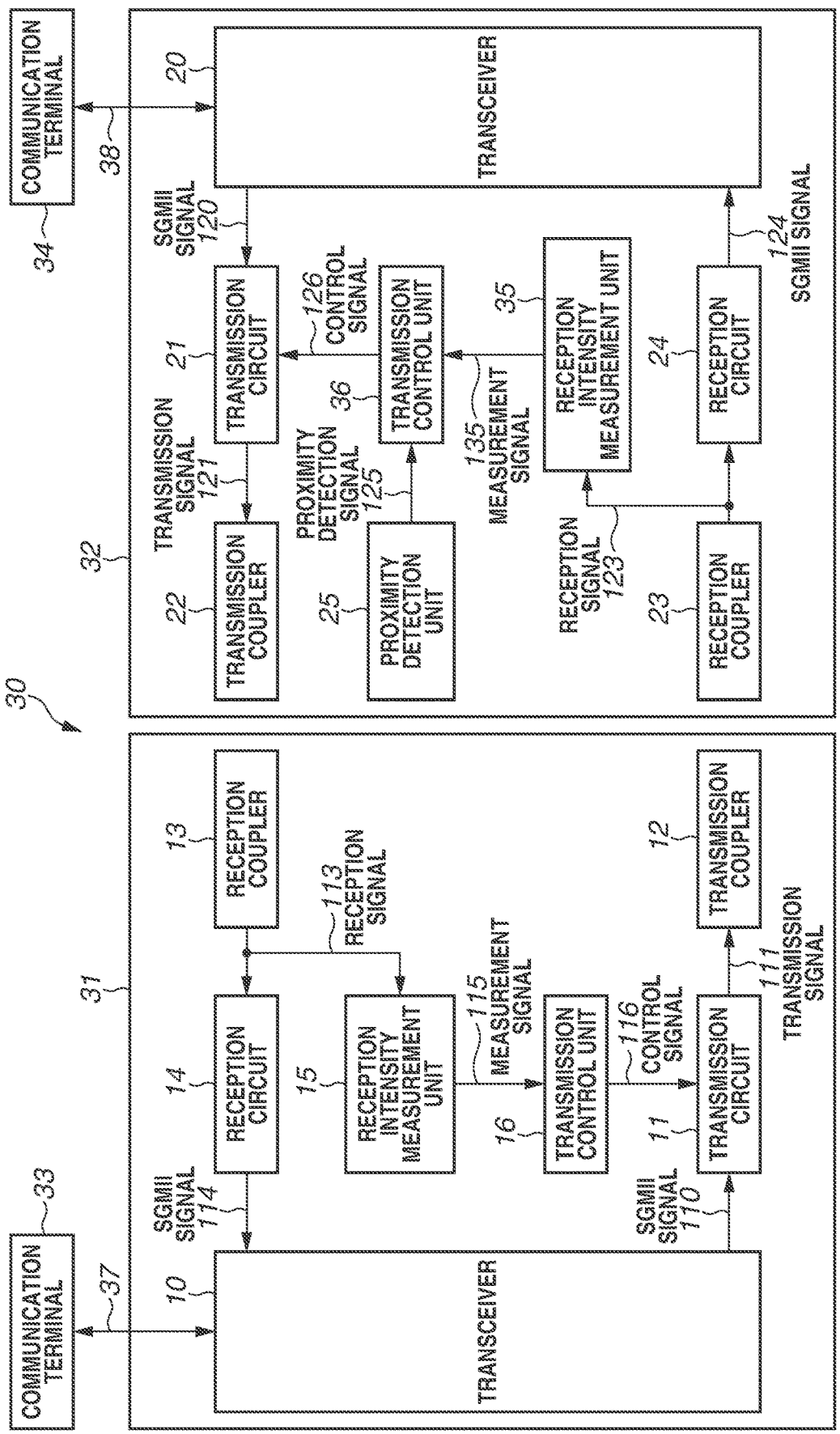

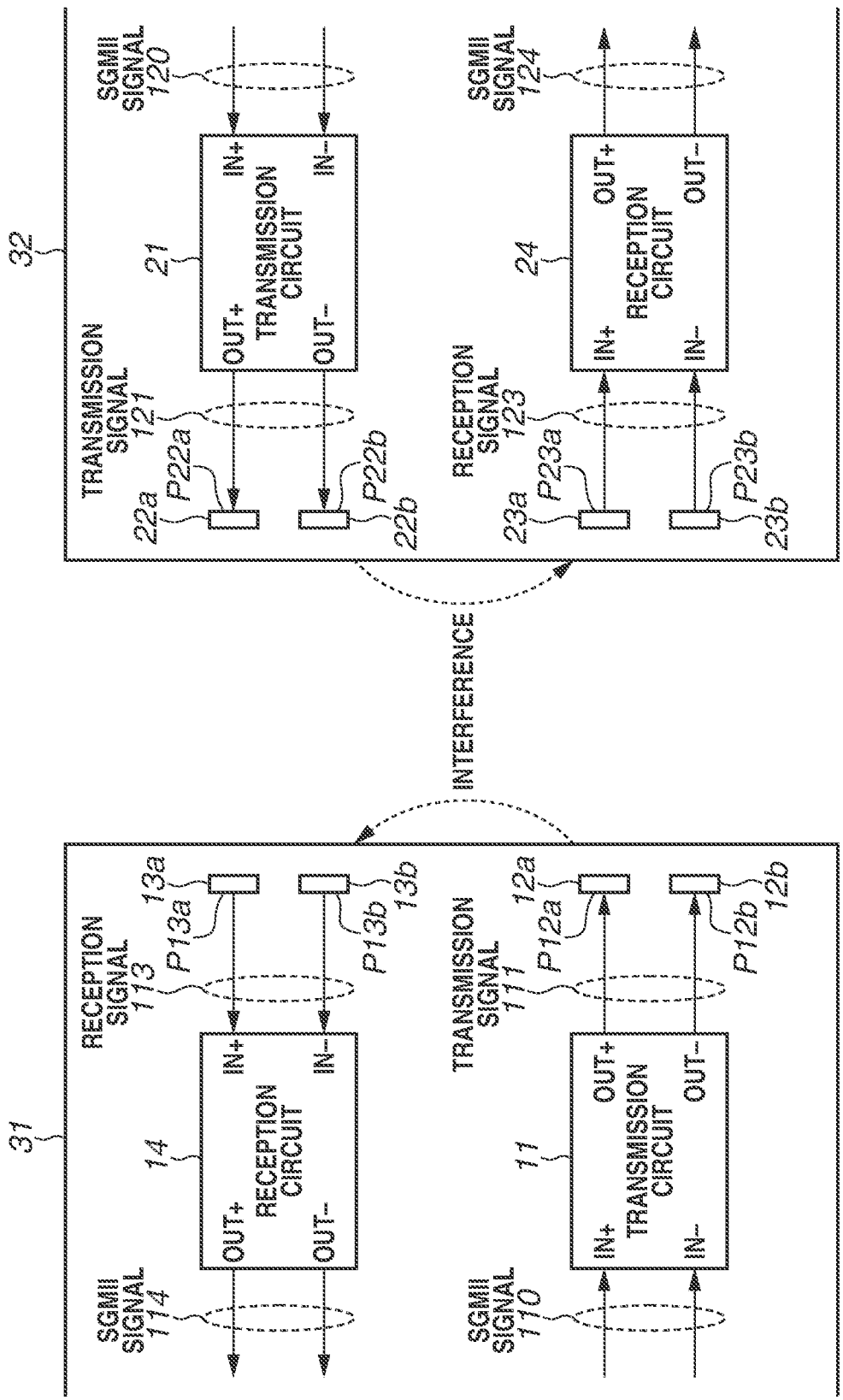

FIG.8A

| X1 [mm] | Y1 [mm] | SP [mm] | CL [mm] | G1 [mm] |
|---|---|---|---|---|
| 5 | 10 | 5 | 5 | 2 |

FIG.8B

| X1 [mm] | Y1 [mm] | SP [mm] | CL [mm] | G1 [mm] |
|---|---|---|---|---|
| 5 | 10 | 5 | 5 | ∞ |

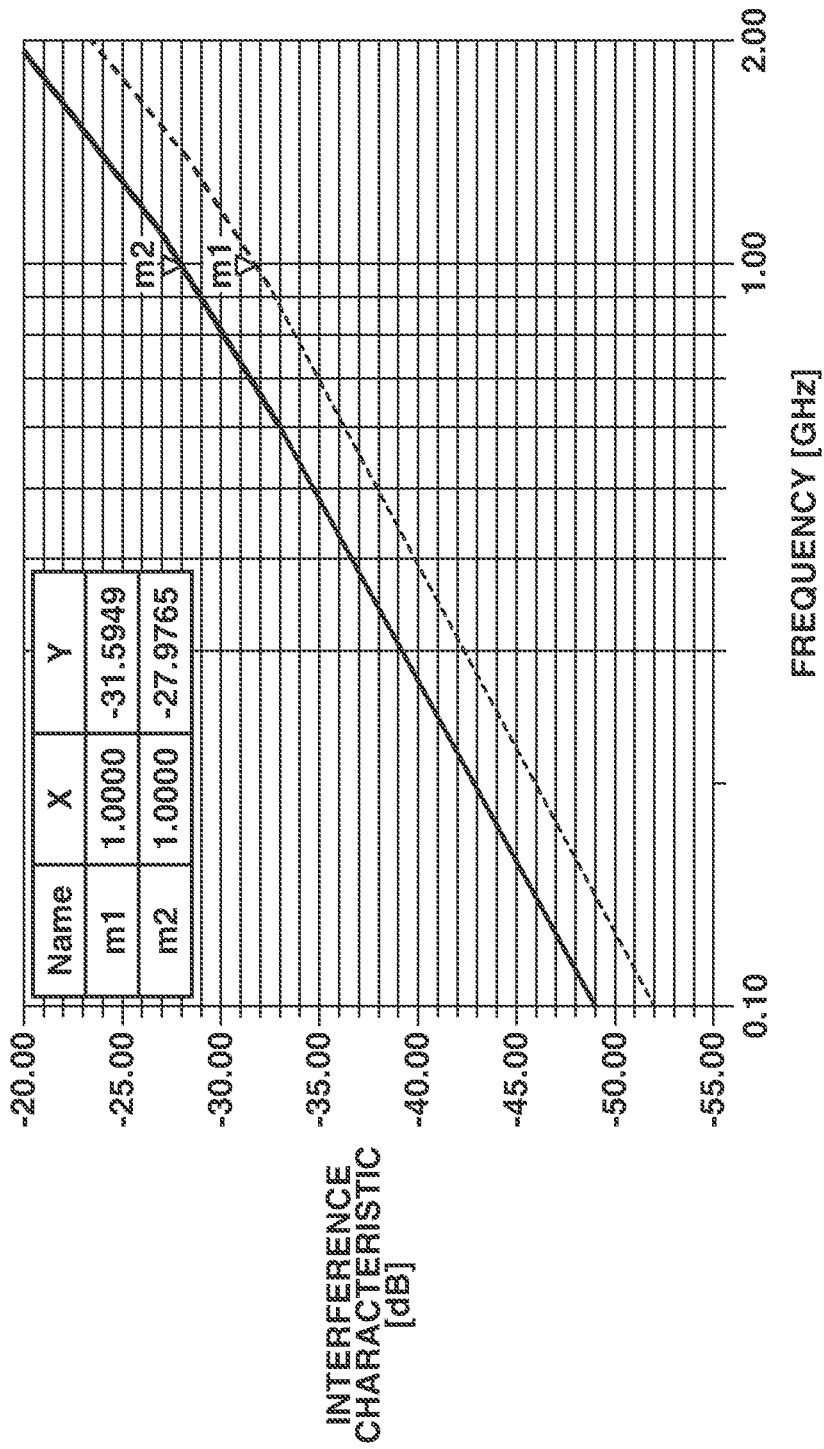

COMMUNICATION APPARATUS AND METHOD FOR CONTROLLING THE SAME

BACKGROUND

Field

The present disclosure relates to a communication apparatus and a method for controlling the communication apparatus.

Description of the Related Art

Proximity communication systems for contactless communication using electromagnetic field coupling between nearby couplers have been known in recent years. Applying such a proximity communication system to perform wireless communication between electronic circuit boards or modules makes it possible to reduce the number of components at connecting portions, such as connectors and harnesses, and to produce an advantage that manufacturing processes are simplified.

Japanese Patent Application Laid-Open No. 2016-29785 discusses a communication system for contactless communication of binary baseband signals using electric field coupling. This communication system enables wireless communication using electric field coupling generated between couplers that are provided in a transmitter and a coupler, respectively, and are disposed opposite and close to each other.

Japanese Patent Application Laid-Open No. 2016-29785 is silent on transmission control in a state (hereinafter referred to as "separation") where the communication apparatuses (the transmitter and the receiver) are too separated to communicate with each other. If transmission is continued even in a case where the communication apparatuses are separated from each other beyond a distance (hereinafter referred to as "proximity") at which the communication apparatuses can communicate with each other, unnecessary transmission power consumption and unnecessary radiation occur.

A possible communication method is that the communication apparatuses periodically perform a communication check (an acknowledgement (ACK) response check), and in a case where an ACK response is received, the communication apparatuses are determined to be in proximity to each other and the communication apparatuses start communication. This method, however, requires transmission for the communication check even during the period of separation of the communication apparatuses and causes unnecessary power consumption and unnecessary radiation.

SUMMARY

Various embodiments of the present disclosure are directed to achieving reduced power consumption and reduced unnecessary radiation.

According to one embodiment of the present disclosure, a communication apparatus configured to contactlessly communicate a baseband signal to another communication apparatus is provided. The communication apparatus includes a transmission unit configured to stop output of a transmission signal while a reception intensity of a reception signal received from the other communication apparatus is lower than a first threshold value, where the transmission signal is to be transmitted to the other communication apparatus. The communication apparatus also includes a transmission coupler configured to be coupled to a reception coupler of the other communication apparatus by electric field coupling.

Further features of the present disclosure will become apparent from the following description of example embodiments with reference to the attached drawings.

BRIEF DESCRIPTION OF THE DRAWINGS

FIG. 2 is a diagram illustrating changes in signals along a time axis according to the first example embodiment.

FIG. 4 is a diagram illustrating an example of a configuration of a proximity communication system according to a second example embodiment.

FIG. 6 is a diagram illustrating transmission couplers, reception couplers, transmission circuits, and reception circuits according to a third example embodiment.

FIGS. 8A and 8B are diagrams illustrating dimensions of the couplers and distances between the couplers according to the third example embodiment.

FIG. 9 is a graph illustrating a simulation result indicating a difference in interference characteristic according to the third example embodiment.

DESCRIPTION OF THE EMBODIMENTS

A first example embodiment of the present disclosure will be described below with reference to FIGS. 1 to 3. The present example embodiment merely describes a concrete example and is not limited to the example described herein.

Figure 1:
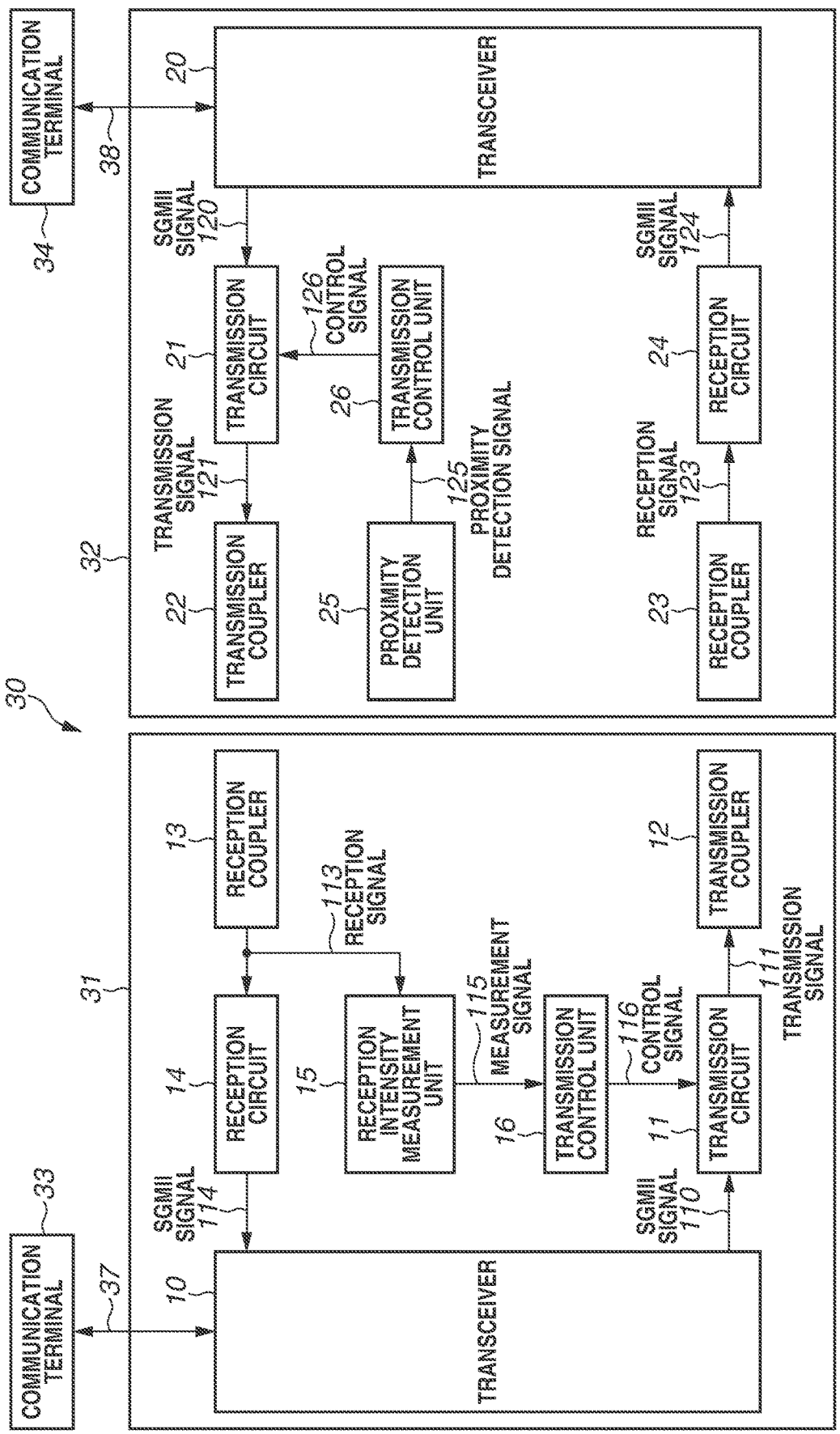
FIG. 1 is a diagram illustrating an example of a configuration of a proximity communication system according to a first example embodiment.

FIG. 1 illustrates an example of a configuration of a proximity communication system 30 according to the present example embodiment. The proximity communication system 30 includes modules 31 and 32 and communication terminals 33 and 34. The proximity communication system 30 performs contactless communication between the communication terminals 33 and 34 by using the modules 31 and 32. The communication terminal 33 and the module 31 are a communication apparatus, and the communication terminal 34 and the module 32 are another communication apparatus.

The modules 31 and 32 are each a proximity communication module. The module 31 includes a transmission coupler 12 and a reception coupler 13. The module 32 includes a transmission coupler 22 and a reception coupler 23. The modules 31 and 32 contactlessly communicate binary baseband signals by using electric field coupling between the transmission coupler 12 and the reception coupler 23 and electric field coupling between the transmission coupler 22 and the reception coupler 13.

An Ethernet signal 37 is a signal between the communication terminal 33 and a transceiver 10, and is a signal conforming to Ethernet standards (a signal conforming to 1000BASE/100BASE/10BASE). An Ethernet signal 38 is a signal between the communication terminal 34 and a transceiver 20, and is a signal conforming to the Ethernet standards (a signal conforming to 1000BASE/100BASE/10BASE).

The baseband signals that are communicated between the modules 31 and 32 by using electric field coupling are serial gigabit media independent interface (SGMII) signals. The transceiver 10 performs conversion between the Ethernet signal 37 and an SGMII signal 110 or 114. The transceiver 20 performs conversion between the Ethernet signal 38 and an SGMII signal 120 or 124.

The SGMII is a gigabit Ethernet physical layer (gigabit Ethernet PHY) interface and is a standard for full-duplex communication (bi-directional upstream and downstream communication using two sets of communication paths) of 1.25-Gbps data using two (upstream and downstream) pairs of low-voltage differential signaling (LVDS) buses.

The SGMII continues to output known 8b/10b encoded patterns at and after power-on and even in an idle period (a period during which effective packet communication is not performed between the communication terminals 33 and 34) corresponding to an idle state.

The module 31 includes the transceiver 10, a transmission circuit 11, the transmission coupler 12, the reception coupler 13, a reception circuit 14, a reception intensity measurement unit 15, and a transmission control unit 16. The module 32 includes the transceiver 20, a transmission circuit 21, the transmission coupler 22, the reception coupler 23, a reception circuit 24, a proximity detection unit 25, and a transmission control unit 26.

Operations of the components of the module 31 will be described first. The transceiver 10 is connected to the communication terminal 33 via a cable. The transceiver 10 converts the Ethernet signal 37 output from the communication terminal 33 into the SGMII signal 110 and outputs the SGMII signal 110 to the transmission circuit 11. The transceiver 10 also converts the SGMII signal 114 output from the reception circuit 14 into the Ethernet signal 37 and outputs the Ethernet signal 37 to the communication terminal 33.

The transmission circuit 11 is a transmission unit. The transmission circuit 11 stops output of a transmission signal 111 to the transmission coupler 12 while a control signal 116 output from the transmission control unit 16 is at a low level. On the other hand, the transmission circuit 11 outputs the input SGMII signal 110 as the transmission signal 111 to the transmission coupler 12 while the control signal 116 is at a high level. The transmission coupler 12 is coupled to the reception coupler 23 of the module 32 by electric field coupling and wirelessly transmits the transmission signal 111 to the reception coupler 23.

The reception coupler 13 is coupled to the transmission coupler 22 of the module 32 by electric field coupling, wirelessly receives a transmission signal 121 transmitted wirelessly from the transmission coupler 22, as a reception signal 113, and outputs the reception signal 113 to the reception circuit 14 and to the reception intensity measurement unit 15.

The reception circuit 14 shapes a waveform of the reception signal 113, restores the reception signal 113 to the SGMII signal 114, and outputs the SGMII signal 114 to the transceiver 10. The reception circuit 14 includes, for example, a hysteresis comparator.

The reception intensity measurement unit 15 measures a signal intensity of the reception signal 113 and outputs a measurement signal 115 corresponding to the signal intensity to the transmission control unit 16. For example, the measurement signal 115 is an analog value proportional to the signal intensity of the reception signal 113. The reception intensity measurement unit 15 includes, for example, a detector circuit (a rectifier circuit and a low-pass filter). In this case, a cutoff frequency of the low-pass filter is set to a value that is sufficiently lower than a minimum frequency of the SGMII signal 114. More specifically, the SGMII signal 114 is 8b/10b encoded and does not contain five or more consecutive bits of "0" or "1". In other words, since the SGMII signal 114 is 1.25 Gbps, the minimum frequency is 125 MHz. Thus, the low-pass filter is desirably capable of sufficiently cutting frequencies lower than 125 MHz.

In a case where the measurement signal 115 is lower than a threshold value A, the transmission control unit 16 determines that the module 31 is separated from the module 32, and outputs the control signal 116 at the low level to the transmission circuit 11. On the other hand, in a case where the measurement signal 115 is equal to or higher than the threshold value A, the transmission control unit 16 determines that the module 31 is in proximity to the module 32, and outputs the control signal 116 at the high level to the transmission circuit 11.

The threshold value A is set to a value that is higher than the signal intensity of the measurement signal 115 (i.e., the reception signal 113) in a state where the module 31 is separated from the module 32, and that is lower than the signal intensity of the measurement signal 115 in a state where the module 31 is in proximity to the module 32.

Operations of the components of the module 32 will be described next. The transceiver 20 is connected to the communication terminal 34 via a cable. The transceiver 20 converts the Ethernet signal 38 output from the communication terminal 34 into the SGMII signal 120 and outputs the SGMII signal 120 to the transmission circuit 21. The transceiver 20 also converts the SGMII signal 124 output from the reception circuit 24 into the Ethernet signal 38 and outputs the Ethernet signal 38 to the communication terminal 34.

The transmission circuit 21 is a transmission unit. The transmission circuit 21 stops output of the transmission signal 121 to the transmission coupler 22 while a control signal 126 output from the transmission control unit 26 is at a low level. On the other hand, the transmission circuit 21 outputs the input SGMII signal 120 as the transmission signal 121 to the transmission coupler 22 while the control signal 126 output from the transmission control unit 26 is at a high level. The transmission coupler 22 is coupled to the reception coupler 13 of the module 31 by electric field coupling and wirelessly transmits the transmission signal 121 to the reception coupler 13.

The reception coupler 23 is coupled to the transmission coupler 12 of the module 31 by electric field coupling, wirelessly receives the transmission signal 111 output from the transmission coupler 12, as a reception signal 123, and outputs the reception signal 123 to the reception circuit 24.

The reception circuit 24 shapes a waveform of the reception signal 123, restores the reception signal 123 to the SGMII signal 124, and outputs the SGMII signal 124 to the transceiver 20. The reception circuit 24 includes, for example, a hysteresis comparator, similarly to the reception circuit 14.

The proximity detection unit 25 detects proximity to the module 31 and outputs a proximity detection signal 125 to the transmission control unit 26. The proximity detection signal 125 is at a high level while the proximity to the module 31 is detected, whereas the proximity detection signal 125 is at a low level while separation from the module 31 is detected. The proximity detection unit 25 can use any known detection method. For example, the proximity detection unit 25 can detect the proximity to the module 31 based on a change in a medium such as light, infrared, magnetic field, electric field, or contact.

The transmission control unit 26 receives input of the proximity detection signal 125. The transmission control unit 26 outputs the control signal 126 at a low level to the transmission circuit 21 while the proximity detection signal 125 is at the low level (while the proximity detection unit 25 detects the separation from the module 31). On the other hand, the transmission control unit 26 outputs the control signal 126 at a high level to the transmission circuit 21 while the proximity detection signal 125 is at the high level (while the proximity detection unit 25 detects the proximity to the module 31).

[Signal Waveforms and Operation Flows]

Figure 3B:
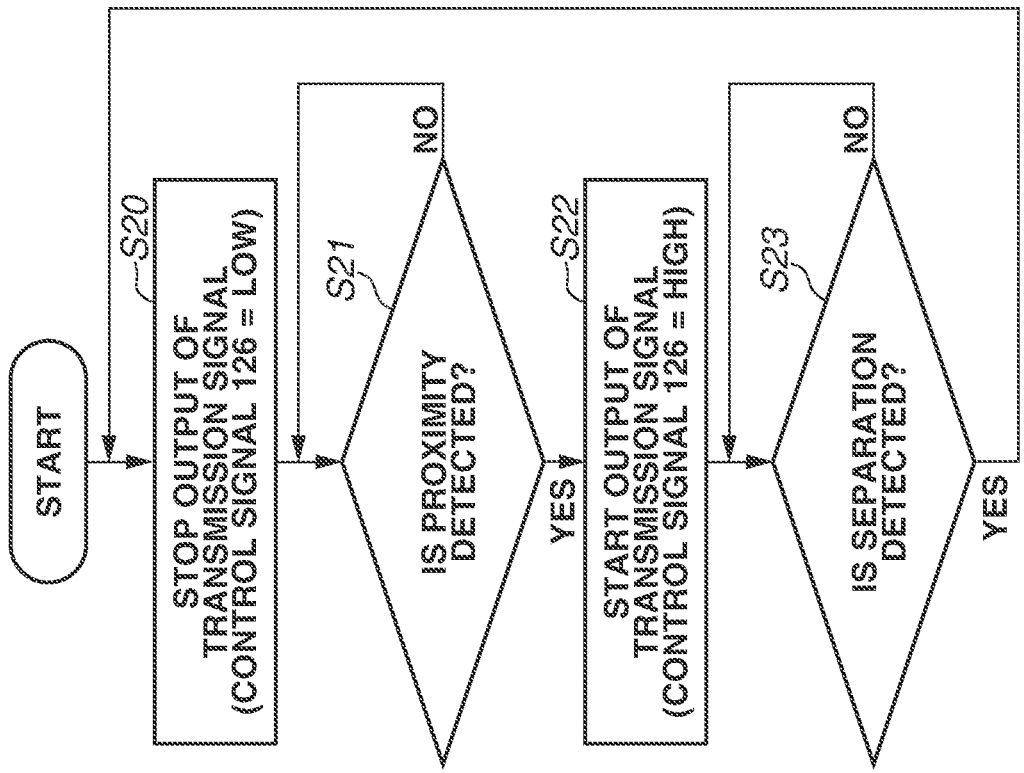
FIGS. 3A and 3B are flowcharts each illustrating a method for controlling the proximity communication system according to the first example embodiment.
Figure 3A:
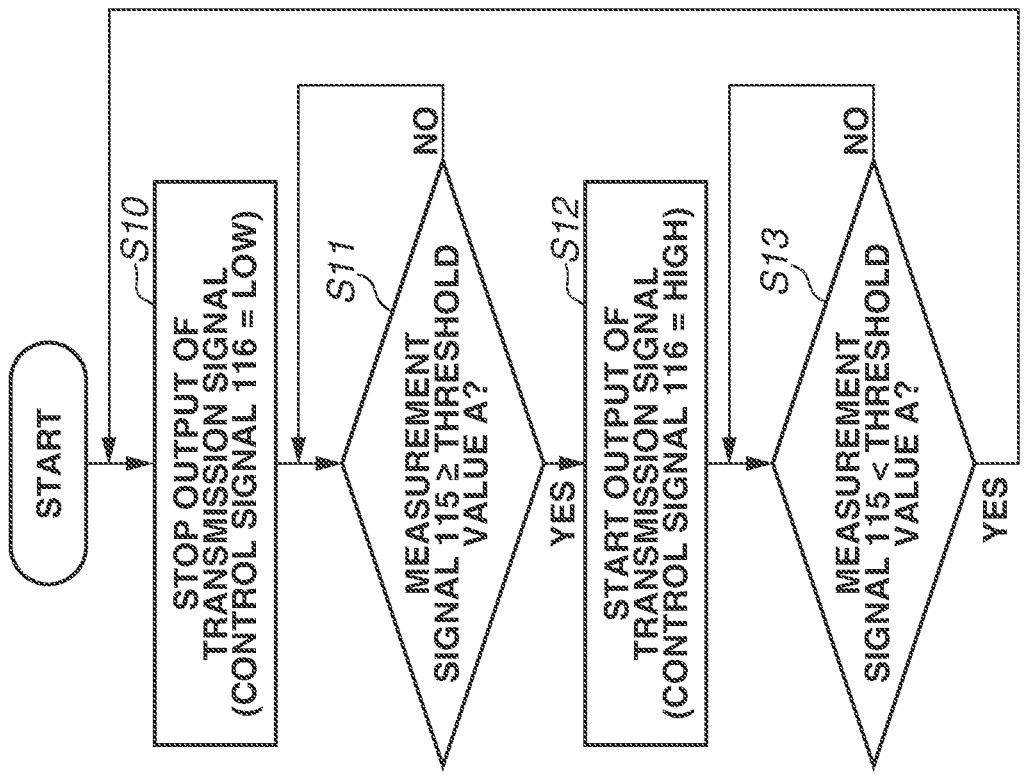

Next, operations of the proximity communication system 30 according to the present example embodiment will be described with reference to FIGS. 2, 3A, and 3B. FIG. 2 illustrates waveforms of the signals in FIG. 1 along a time axis. FIG. 3A is a flowchart illustrating a control method performed when the module 31 is started up (powered on). FIG. 3B is a flowchart illustrating a control method performed when the module 32 is started up (powered on).

Operations of the transmission control units 16 and 26 in a period from time T0 to time T6 illustrated in FIG. 2 will be mainly described. First, operations from when the modules 31 and 32 are started up to when the modules 31 and 32 transition from a state of being separated from each other to a state of being in proximity to each other will be described.

At time T0 in FIG. 2, the modules 31 and 32 are started up. At this time, the modules 31 and 32 are separated from each other. For convenience of description, the modules 31 and 32 are both started up at time T0 but may be started up at different times.

The transceiver 10 starts output of the known pattern in the idle period as the SGMII signal 110 to the transmission circuit 11. The transceiver 20 starts output of the known pattern in the idle period as the SGMII signal 120 to the transmission circuit 21.

At time T0, processing in steps S10 and S11 in FIG. 3A is performed by the module 31. In step S10 in FIG. 3A, the transmission control unit 16 outputs the control signal 116 at the low level to the transmission circuit 11. After receiving the input of the control signal 116 at the low level, the transmission circuit 11 stops the output of the transmission signal 111.

In step S11 in FIG. 3A, the transmission control unit 16 waits until the measurement signal 115 reaches or exceeds the threshold value A. In a state where the modules 31 and 32 are separated from each other, the measurement signal 115 is lower than the threshold value A. In a case where the measurement signal 115 is lower than the threshold value A, the transmission control unit 16 outputs the control signal 116 at the low level to the transmission circuit 11. After receiving the input of the control signal 116 at the low level, the transmission circuit 11 stops the output of the transmission signal 111.

Meanwhile, at time T0, processing in steps S20 and S21 in FIG. 3B is performed by the module 32. In step S20 in FIG. 3B, the transmission control unit 26 outputs the control signal 126 at the low level to the transmission circuit 21. After receiving the input of the control signal 126 at the low level, the transmission circuit 21 stops the output of the transmission signal 121.

In step S21 in FIG. 3B, the transmission control unit 26 waits until the proximity detection signal 125 changes to the high level. In a state where the modules 31 and 32 are separated from each other, the proximity detection signal 125 is at the low level. In a case where the proximity detection signal 125 is at the low level, the transmission control unit 16 outputs the control signal 126 at the low level to the transmission circuit 21. After receiving the input of the control signal 126 at the low level, the transmission circuit 21 stops the output of the transmission signal 121.

At time T1 in FIG. 2, the modules 31 and 32 are brought into proximity to each other. The proximity detection unit 25 detects the proximity to the module 31 and changes the proximity detection signal 125 from the low level to the high level. In a case where the proximity detection signal 125 is changed from the low level to the high level (YES in step S21), the processing proceeds to step S22 in FIG. 3B.

At time T2 in FIG. 2 and in step S22 in FIG. 3B, the transmission control unit 26 changes the control signal 126 from the low level to the high level. When the control signal 126 changes to the high level, the transmission circuit 21 starts the output of the SGMII signal 120 as the transmission signal 121 to the transmission coupler 22. The transmission coupler 22 wirelessly transmits the transmission signal 121 to the reception coupler 13. In step S23 in FIG. 3B, the transmission control unit 26 waits until the proximity detection signal 125 changes to the low level.

Through the above-described operations, the transmission circuit 21 starts the output of the SGMII signal 120 as the transmission signal 121 to the transmission coupler 22. The reception coupler 13 receives the transmission signal 121 transmitted wirelessly from the transmission coupler 22, as the reception signal 113. The reception circuit 14 restores the reception signal 113 to the SGMII signal 114 and starts the output of the SGMII signal 114 to the transceiver 10. Accordingly, the signal intensity of the reception signal 113 increases.

At time T3 in FIG. 2 and in step S11 in FIG. 3A, in a case where the measurement signal 115 output from the reception intensity measurement unit 15 is the threshold value A or more (YES in step S11), the processing proceeds to step S12. In step S12, the transmission control unit 16 changes the control signal 116 from the low level to the high level. When the control signal 116 changes to the high level, the transmission circuit 11 starts the output of the SGMII signal 110 as the transmission signal 111 to the transmission coupler 12. The transmission coupler 12 wirelessly transmits the transmission signal 111 to the reception coupler 23. In step S13 in FIG. 3A, the transmission control unit 16 waits until the measurement signal 115 becomes lower than the threshold value A.

Through the above-described operations, the transmission circuit 11 starts the output of the SGMII signal 110 as the transmission signal 111 to the transmission coupler 12. The reception coupler 23 receives the transmission signal 111 transmitted wirelessly from the transmission coupler 12, as the reception signal 123. The reception circuit 24 restores the reception signal 123 to the SGMII signal 124 and outputs the SGMII signal 124 to the transceiver 20.

Through the above-described operations, the modules 31 and 32 start the output of the transmission signals 111 and 121, triggered by the proximity of the modules 31 and 32 to each other. As a result, the SGMII signals 110 and 120 are transmitted through full-duplex transmission, and Ethernet communication between the communication terminals 33 and 34 is achieved.

Next, operations performed in a case where the modules 31 and 32 transition from the state of being in proximity to each other to the state of being separated from each other will be described.

At time T4 in FIG. 2, the modules 31 and 32 are separated from each other. The proximity detection unit 25 detects the separation from the module 31 and outputs the proximity detection signal 125 at the low level. In step S23 in FIG. 3B, in a case where the proximity detection signal 125 changes from the high level to the low level (YES in step S23), the processing returns to step S20.

At time T5 in FIG. 2 and in step S20 in FIG. 3B, the transmission control unit 26 changes the control signal 126 from the high level to the low level. In a case where the control signal 126 is at the low level, the transmission circuit 21 stops the output of the transmission signal 121 to the transmission coupler 22. Accordingly, the signal intensity of the reception signal 113 decreases.

At time T6 in FIG. 2 and in step S13 in FIG. 3A, in a case where the measurement signal 115 output from the reception intensity measurement unit 15 is lower than the threshold value A (YES in step S13), the processing returns to step S10. In step S10, the transmission control unit 16 changes the control signal 116 from the high level to the low level. In a case where the control signal 116 is at the low level, the transmission circuit 11 stops the output of the transmission signal 111 to the transmission coupler 12.

As described above, according to the present example embodiment, the proximity communication system 30 stops the output of the transmission signals 111 and 121 in a case where the modules 31 and 32 are separated from each other. This makes it possible to reduce power consumption and suppress unnecessary radiation.

While the baseband signals have been described as the SGMII signals, the baseband signals are not limited thereto. For example, any standard such as 1000BASE-X or 100BASE-FX is applicable as long as the baseband signals are full-duplex baseband signals into which a known pattern is inserted during the idle period. In addition, the baseband signals may not necessarily be binary signals and may be three- or higher level pulse-amplitude modulated signals.

While the configuration in which the communication terminal 33 and the transceiver 10 are connected using Ethernet and the communication terminal 34 and the transceiver 20 are connected using Ethernet have been described above, the present example embodiment is not limited thereto. For example, the communication terminals 33 and 34 may be integrated circuit (IC) chips on which an Ethernet media access control (Ethernet MAC) layer and layers above the Ethernet MAC layer are implemented, and a media independent interface (MII) or a gigabit MII (GMII) may be used to connect the communication terminal 33 and the transceiver 10, and connect the communication terminal 34 and the transceiver 20. Furthermore, as described above, the baseband signals may be other baseband signals that are unrelated to the Ethernet standards such as SGMII, 1000BASE-X, and 100BASE-FX.

While the configuration in which the transmission circuits 11 and 21 directly output the SGMII signals 110 and 120 as the transmission signals 111 and 121, respectively, has been described above, the present example embodiment is not limited thereto. For example, the transmission circuits 11 and 21 may perform waveform amplification, frequency correction (emphasis), and jitter cleaner on the SGMII signals 110 and 120 and may output the resulting signals as the transmission signals 111 and 121, respectively.

While the reception circuits 14 and 24 have been described as hysteresis comparators, the reception circuits 14 and 24 are not limited thereto. Any configuration using a known method capable of restoring the reception signals 113 and 123 transmitted through the reception couplers 13 and 23 is applicable to the reception circuits 14 and 24.

While the configuration in which the transmission control unit 26 generates the control signal 126 based on the proximity detection signal 125 has been described above for convenience of description, a configuration in which the transmission control unit 26 is eliminated and the transmission circuit 21 uses the proximity detection signal 125 as the control signal 126 may be used.

While the coupling between the transmission coupler 12 and the reception coupler 23 and the coupling between the transmission coupler 22 and the reception coupler 13 have been described as electric field coupling, the present example embodiment is not limited thereto, and a structure using magnetic field coupling or electromagnetic field coupling (coupling via both an electric field and a magnetic field) may be used.

While the reception intensity measurement unit 15 has been described as a unit that detects the presence or absence of the reception signal 113 by measuring the signal intensity of the reception signal 113 output from the reception coupler 13, the reception intensity measurement unit 15 is not limited thereto. The reception intensity measurement unit 15 may be configured to finally determine the presence or absence of the reception signal 113 that is received at the time of proximity to the module 32. For example, in a case where a hysteresis comparator is used as the reception circuit 14, the reception intensity measurement unit 15 may determine the presence or absence of the reception signal 113 by detecting alternating current (AC) components of output signals of the hysteresis comparator. More specifically, a threshold value of the hysteresis comparator is set so that the reception signal 113 at the time of separation from the module 32 is lower than or equal to the threshold value. Accordingly, the hysteresis comparator provides a direct current (DC) output at the time of separation from the module 32, and provides an AC output (a 1.25-Gbps signal output) at the time of proximity to the module 32. Thus, the reception intensity measurement unit 15 may determine the presence or absence of the reception signal 113 by determining a change in output of the hysteresis comparator.

As described above, the module 31 is a communication apparatus that contactlessly communicates full-duplex baseband signals to the module 32. The module 32 is a communication apparatus that contactlessly communicates full-duplex baseband signals to the module 31. The baseband signals are signals, between the modules 31 and 32, into which a known pattern is inserted during the idle period. For example, the baseband signals are SGMII signals, 100BASE-FX signals, or 1000BASE-X signals.

As illustrated in FIG. 3A, the transmission circuit 11 stops the output of the transmission signal 111, which is to be transmitted to the module 32, while the reception intensity of the reception signal 113 received from the module 32 is lower than the threshold value. The transmission circuit 11 outputs the transmission signal 111, which is to be transmitted to the module 32, while the reception intensity of the reception signal 113 is higher than or equal to the threshold value. The threshold value is a value that is higher than the signal intensity of the reception signal 113 in a state where the modules 31 and 32 are separated from each other by a distance at which the modules 31 and 32 are not communicable with each other, and that is lower than the signal intensity of the reception signal 113 in a state where the modules 31 and 32 are separated from each other by a distance at which the modules 31 and 32 are communicable with each other.

As illustrated in FIG. 3B, the transmission circuit 21 stops the output of the transmission signal 121, which is to be transmitted to the module 31, while the proximity detection unit 25 does not detect the proximity to the module 31. The transmission circuit 21 outputs the transmission signal 121, which is to be transmitted to the module 31, while the proximity detection unit 25 detects the proximity to the module 31.

According to the present example embodiment, the modules 31 and 32 are capable of stopping the output of the transmission signals 111 and 121, triggered by the separation of the modules 31 and 32 from each other.

In the first example embodiment described above, the module 32 starts the output of the transmission signal 121 in a case where the proximity to the module 31 is detected. However, with the detection of the proximity to the module 31 alone, there is a possibility of false detection by the module 32. For example, a configuration in which the proximity detection unit 25 uses a Hall element and the module 31 includes a permanent magnet can be used to detect the proximity of the modules 31 and 32 to each other. In this case, if another permanent magnet is brought near the Hall element of the proximity detection unit 25, the module 32 erroneously detects the proximity to the module 31 and starts the output of the transmission signal 121. In other words, there is a possibility that the module 32 may cause unnecessary power consumption and unnecessary radiation due to false detection.

To address the issue, in a second example embodiment of the present disclosure, a reception intensity measurement unit is provided also in the module 32. In a case where the signal intensity of the reception signal 123 is still lower than the threshold value after a predetermined period has elapsed since the output of the transmission signal 121 by the transmission circuit 21, the transmission circuit 21 stops the output of the transmission signal 121. This suppresses unnecessary power consumption and unnecessary radiation due to false detection.

FIG. 4 illustrates an example of a configuration of the proximity communication system 30 according to the present example embodiment. In FIG. 4, components similar to those illustrated in FIG. 1 according to the first example embodiment are given the same reference numerals, and redundant descriptions thereof will be omitted. The proximity communication system 30 in FIG. 4 is different from the proximity communication system 30 in FIG. 1 in that a reception intensity measurement unit 35 is additionally provided and a transmission control unit 36 is provided in place of the transmission control unit 26. The module 32 includes the transceiver 20, the transmission circuit 21, the transmission coupler 22, the reception coupler 23, the reception circuit 24, the proximity detection unit 25, the reception intensity measurement unit 35, and the transmission control unit 36.

The reception intensity measurement unit 35 is similar to the reception intensity measurement unit 15. The reception intensity measurement unit 35 measures the signal intensity of the reception signal 123 and outputs a measurement signal 135 corresponding to the signal intensity to the transmission control unit 36. The transmission control unit 36 receives input of the proximity detection signal 125. The transmission control unit 36 outputs the control signal 126 at the low level to the transmission circuit 21 while the proximity detection signal 125 is at the low level (while the proximity detection unit 25 detects the separation from the module 31). In a case where the proximity detection signal 125 changes from the low level to the high level (in a case where the proximity detection unit 25 detects the proximity to the module 31), the transmission control unit 36 outputs the control signal 126 at the high level to the transmission circuit 21. Furthermore, in a case where the measurement signal 135 is lower than the threshold value A after the predetermined time has elapsed since the change of the proximity detection signal 125 to the high level, the transmission control unit 36 outputs the control signal 126 at the low level to the transmission circuit 21. At this time, in a case where the measurement signal 135 is lower than the threshold value A, the transmission control unit 36 determines that the module 31 is not in proximity, i.e., false detection by the proximity detection unit 25 occurs, and the transmission control unit 36 outputs the control signal 126 at the low level to the transmission circuit 21. On the other hand, in a case where the measurement signal 135 is higher than or equal to the threshold value A after the predetermined time has elapsed since the change of the proximity detection signal 125 to the high level, the transmission control unit 36 maintains the control signal 126 at the high level.

Figure 5:
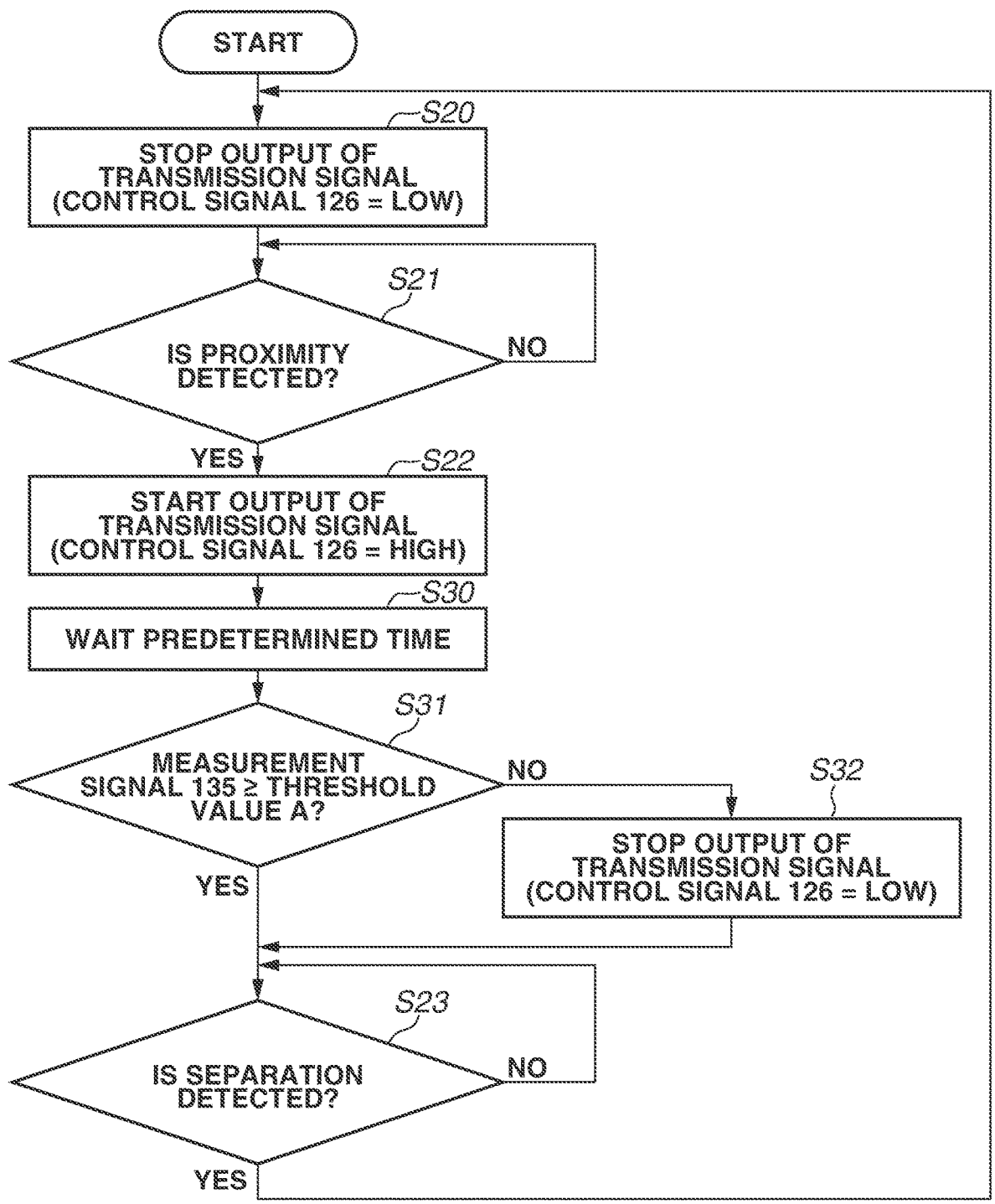
FIG. 5 is a flowchart illustrating a method for controlling the proximity communication system according to the second example embodiment.

FIG. 5 is a flowchart illustrating a control method performed at the time of startup of the module 32. Processing in FIG. 5 is started when the module 32 is started up.

In step S20, the transmission control unit 36 outputs the control signal 126 at the low level to the transmission circuit 21. After receiving the input of the control signal 126 at the low level, the transmission circuit 21 stops the output of the transmission signal 121.

In step S21, the transmission control unit 36 waits until the proximity detection signal 125 changes to the high level. In a state where the modules 31 and 32 are separated from each other, the proximity detection signal 125 is at the low level. In a case where the proximity detection signal 125 is at the low level, the transmission control unit 16 outputs the control signal 126 at the low level to the transmission circuit 21. After receiving the input of the control signal 126 at the low level, the transmission circuit 21 stops the output of the transmission signal 121.

In a case where the module 31 is in proximity, the proximity detection unit 25 changes the proximity detection signal 125 from the low level to the high level. In a case where the proximity detection signal 125 is changed from the low level to the high level (YES in step S21), the processing proceeds to step S22.

In step S22, the transmission control unit 36 changes the control signal 126 from the low level to the high level. In a case where the control signal 126 is at the high level, the transmission circuit 21 outputs the SGMII signal 120 as the transmission signal 121 to the transmission coupler 22. The transmission coupler 22 wirelessly transmits the transmission signal 121 to the reception coupler 13.

In step S30, the transmission control unit 36 waits until the predetermined time elapses after the change of the proximity detection signal 125 from the low level to the high level, and then the processing proceeds to step S31.

In step S31, in a case where the measurement signal 135 is higher than or equal to the threshold value A after the predetermined time has elapsed since the change of the proximity detection signal 125 from the low level to the high level (YES in step S31), the transmission control unit 36 maintains the control signal 126 at the high level, and the processing proceeds to step S23. On the other hand, in a case where the measurement signal 135 is lower than the threshold value A after the predetermined time has elapsed since the change of the proximity detection signal 125 from the low level to the high level (NO in step S31), the processing proceeds to step S32.

The threshold value A is a value that is higher than the measurement signal 135 (i.e., the reception intensity of the reception signal 123) in a state where the modules 31 and 32 are separated from each other, and that is lower than the measurement signal 135 in a state where the modules 31 and 32 are in proximity to each other.

The predetermined time is the time from when the transmission circuit 21 of the module 32 starts the output of the transmission signal 121 to when the transmission circuit 11 of the module 31 starts the output of the transmission signal 111. More specifically, the predetermined time is the time from time T2 to time T3 in FIG. 2. In other words, the measurement signal 135 being lower than the threshold value A after the elapse of the predetermined time indicates that the modules 31 and 32 are separated from each other and the proximity detection in step S21 is false.

In step S32, the transmission control unit 36 outputs the control signal 126 at the low level to the transmission circuit 21. After receiving the input of the control signal 126 at the low level, the transmission circuit 21 stops the output of the transmission signal 121. Then, the processing proceeds to step S23.

In step S23, the transmission control unit 26 waits until the proximity detection signal 125 changes to the low level. In a case where the proximity detection signal 125 changes from the high level to the low level (YES in step S23), the processing returns to step S20.

While the transmission control unit 36 has been described to perform the operation of maintaining the control signal 126 at the low level before the proximity detection unit 25 detects the separation in a case where the measurement signal 135 is lower than the threshold value A in step S31 in FIG. 5, the transmission control unit 36 is not limited thereto. For example, after determining that the measurement signal 135 is lower than the threshold value A, the transmission control unit 36 may check the measurement signal 135 at regular intervals while the proximity detection unit 25 detects the proximity. Then, in a case where the measurement signal 135 reaches or exceeds the threshold A, the transmission control unit 36 may change the control signal 126 from the low level to the high level.

As described above, the transmission circuit 21 stops the output of the transmission signal 121, which is to be transmitted to the module 31, while the proximity detection unit 25 does not detect the proximity to the module 31. In a case where the proximity detection unit 25 detects the proximity to the module 31, the transmission circuit 21 starts the output of the transmission signal 121 to be transmitted to the module 31. In a case where the reception intensity of the reception signal 123 received from the module 31 is lower than the threshold value A after the predetermined time has elapsed in step S30, the transmission circuit 21 stops the output of the transmission signal 121 to be transmitted to the module 31.

The predetermined time in step S30 is the time from when the transmission circuit 21 starts the output of the transmission signal 121 to when the module 31 starts transmission. The threshold value A is a value that is higher than the signal intensity of the reception signal 123 in a state where the modules 31 and 32 are separated by a distance at which the modules 31 and 32 are not communicable with each other, and that is lower than the signal intensity of the reception signal 123 in a state where the modules 31 and 32 are separated from each other by a distance at which the modules 31 and 32 are communicable with each other.

According to the present example embodiment, the transmission circuit 21 is capable of stopping the output of the transmission signal 121 in a case where the proximity detection in step S21 is false. This suppresses unnecessary power consumption and unnecessary radiation due to false detection.

A third example embodiment of the present disclosure is an extension of the second example embodiment. More specifically, a reception coupler detects an output from a transmission circuit in the same module to determine whether the proximity detection is false, and in a case where the proximity detection is false, the transmission circuit immediately stops the output.

First, an intensity of a signal which originates from the output from the transmission circuit in the same module and which is received by the reception coupler will be described with reference to FIGS. 6 to 9. The intensity varies depending on whether the modules 31 and 32 are in proximity to or separated from each other. Hereinafter, the signal which originates from the output from the transmission circuit in the same module and which is received by the reception coupler will be referred to as the interference signal.

FIG. 6 illustrates an example of a specific configuration of the transmission circuit 11, the transmission coupler 12, the reception coupler 13, the reception circuit 14, the transmission circuit 21, the transmission coupler 22, the reception coupler 23, and the reception circuit 24 in FIGS. 1 and 4. The transmission coupler 12 includes two conductors 12a and 12b and two power supply ports P12a and P12b. The reception coupler 13 includes two conductors 13a and 13b and two power supply ports P13a and P13b. The transmission coupler 22 includes two conductors 22a and 22b and two power supply ports P22a and P22b. The reception coupler 23 includes two conductors 23a and 23b and two power supply ports P23a and P23b.

The SGMII signals 110, 114, 120, and 124 are each a differential signal and illustrated with two lines. Input and output terminals of the transmission circuits 11 and 21 and the reception circuits 14 and 24 are illustrated with two ports (with "+" or "−" at each end).

The power supply ports P12a and P12b are connection ends for connecting the transmission circuit 11 and the conductors 12a and 12b. The power supply ports P13a and P13b are connection ends for connecting the reception circuit 14 and the conductors 13a and 13b. The power supply ports P22a and P22b are connection ends for connecting the transmission circuit 21 and the conductors 22a and 22b. The power supply ports P23a and P23b are connection ends for connecting the reception circuit 24 and the conductors 23a and 23b.

When the modules 31 and 32 are in proximity to each other, the conductors 12a and 12b and the conductors 23a and 23b are in proximity to each other and the conductors 13a and 13b and the conductors 22a and 22b are in proximity to each other, and the modules 31 and 32 are coupled to each other via electric field components.

Meanwhile, the transmission coupler 12 and the reception coupler 13 in the same module 31 are coupled to no small extent by electric field coupling, and the transmission coupler 22 and the reception coupler 23 in the same module 32 are coupled to no small extent by electric field coupling. The electric field coupling causes an interference signal between the transmission coupler 12 and the reception coupler 13 and causes an interference signal between the transmission coupler 22 and the reception coupler 23. The interference signal intensity is higher in a case where the modules 31 and 32 are separated from each other than in a case where the modules 31 and 32 are in proximity to each other. The change in interference signal intensity due to the proximity and separation of the modules 31 and 32 will be described more specifically with reference to a simulation result.

Figure 7B:
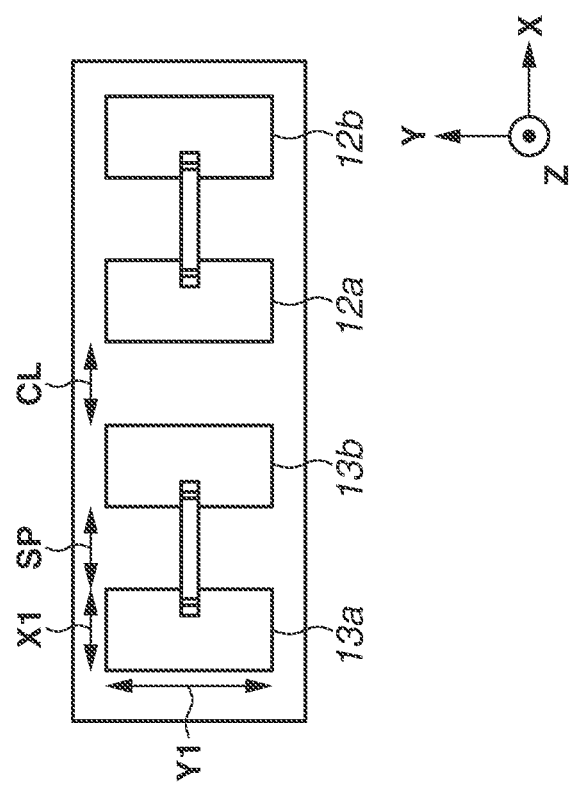
FIGS. 7A and 7B are diagrams illustrating an example of a structure of the couplers according to the third example embodiment.
Figure 7A:
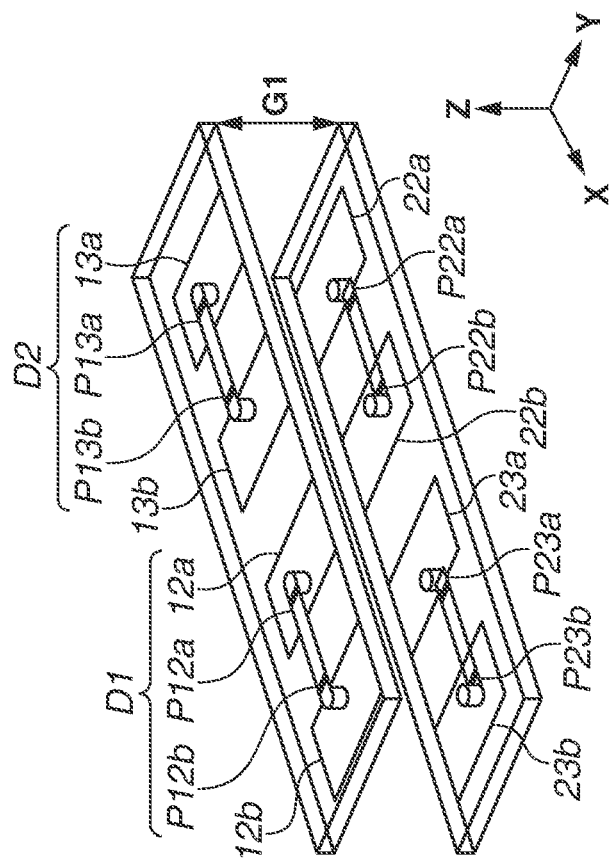

FIGS. 7A and 7B illustrate an example of a structure of the transmission couplers 12 and 22 and the reception couplers 13 and 23 that are used in simulation. FIG. 7A is a perspective view illustrating the structure of the transmission couplers 12 and 22 and the reception couplers 13 and 23 that are used in simulation. FIG. 7B illustrates the structure of FIG. 7A as viewed from a positive direction of a Z-axis of the coordinate system. Reference numerals in FIG. 7A correspond to those in FIG. 6. An upper portion in FIG. 7A illustrates the transmission coupler 12 and the reception coupler 13 of the module 31. A lower portion in FIG. 7B illustrates the transmission coupler 22 and the reception coupler 23 of the module 32. The conductors 12a, 12b, 13a, 13b, 22a, 22b, 23a, and 23b are formed by copper patterns on a glass epoxy substrate having a thickness of 1 mm. The conductors 12a, 12b, 13a, 13b, 22a, 22b, 23a, and 23b and the power supply ports P12a, P12b, P13a, P13b, P22a, P22b, P23a, and P23b are connected through vias, respectively. A differential port D1 is a port for differential signals of the power supply ports P12a and P12b. A differential port D2 is a port for differential signals of the power supply ports P13a and P13b.

FIGS. 8A and 8B illustrate dimensions X1, Y1, and SP of the transmission couplers 12 and 22 and the reception couplers 13 and 23 in FIG. 7B, and distances G1 and CL between the transmission couplers 12 and 22 and the reception couplers 13 and 23 in FIGS. 7A and 7B.

FIG. 8A illustrates the numerical values in a state where the modules 31 and 32 are in proximity to each other, and the distance G1 between the couplers of the different modules 31 and 32 is 2 mm FIG. 8B illustrates the numerical values in a state where the modules 31 and 32 are separated from each other, and the distance G1 between the couplers of the different modules 31 and 32 is infinity (with no opposed module).

FIG. 9 is a graph illustrating a result of simulation of interference characteristics (Sdd21 from the differential port D1 to the differential port D2) of the transmission couplers 12 and 22 and the reception couplers 13 and 23 in FIGS. 7A and 7B. A differential impedance of the differential ports D1 and D2 in the simulation is 100Ω. A vertical axis of the graph in FIG. 9 represents gains, and a horizontal axis of the graph in FIG. 9 represents frequencies.

A dotted line in FIG. 9 indicates the interference characteristic of the modules 31 and 32 in the state of being in proximity to each other as illustrated in FIG. 8A. A solid line in FIG. 9 indicates the interference characteristic of the modules 31 and 32 in the state of being separated from each other as illustrated in FIG. 8B.

The simulation result in FIG. 9 indicates that the interference characteristic of the modules 31 and 32 in proximity to each other is −31.59 dB at 1 GHz. The interference characteristic of the modules 31 and 32 separated from each other is −27.97 dB at 1 GHz. More specifically, the interference signal intensity is higher by about 3.6 dB (1.5 times in voltage ratio) in a case where the modules 31 and 32 are separated from each other than in a case where the modules 31 and 32 are in proximity to each other.

According to the present example embodiment, the proximity communication system 30 detects a change in interference signal intensity to determine whether the proximity detection is false, and the proximity communication system 30 stops the output of the transmission signal 121 from the transmission circuit 21.

Specific operations will be described next. A configuration of the proximity communication system 30 according to the present example embodiment is similar to the configuration according to the second example embodiment, except for the operation of the transmission control unit 36 according to the second example embodiment.

Figure 10:
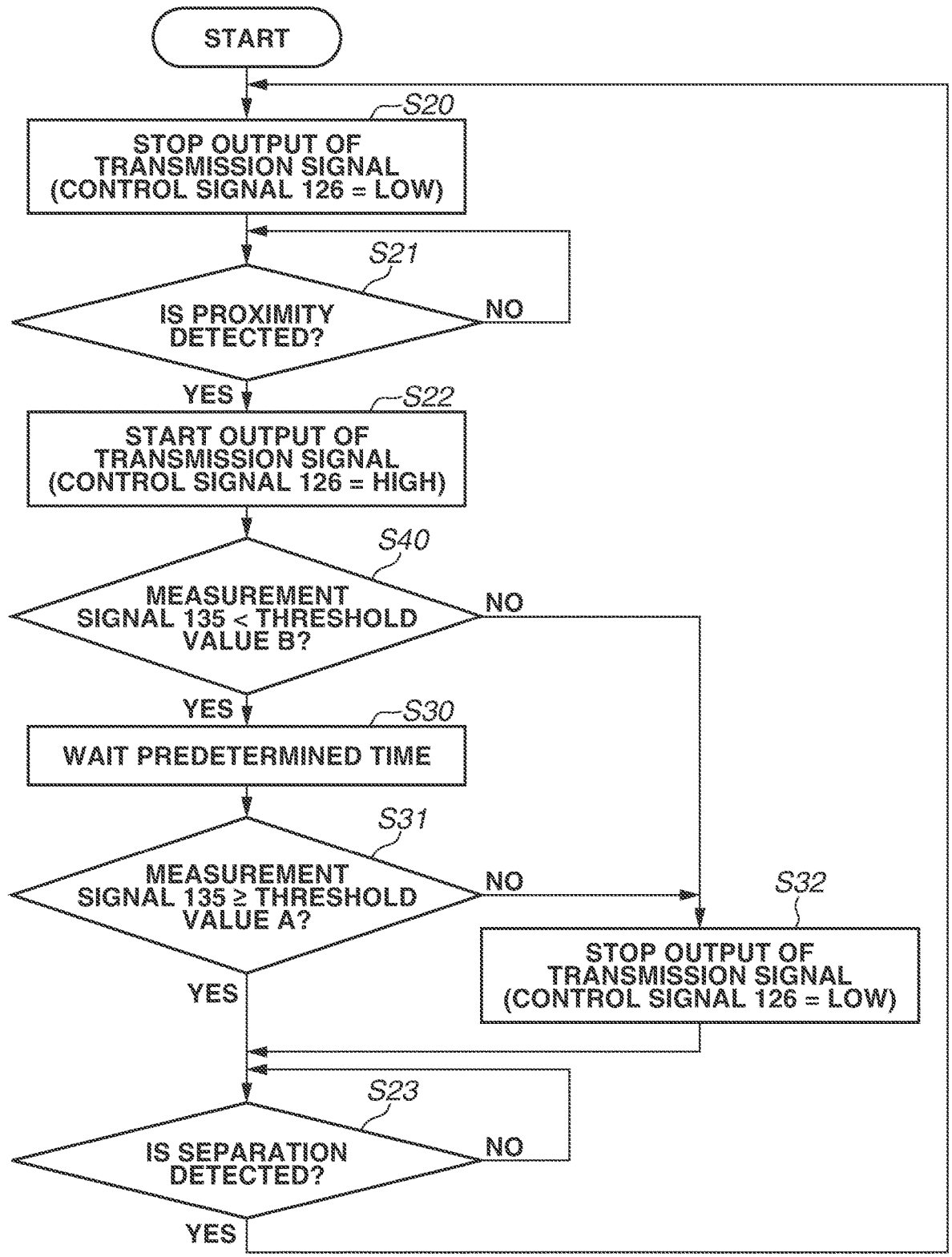
FIG. 10 is a flowchart illustrating a method for controlling a proximity communication system according to the third example embodiment.

FIG. 10 is a flowchart illustrating a control method performed at the time of startup of the module 32. Processing in FIG. 10 is started when the module 32 is started up.

In steps S20 to S22, the module 32 performs processing similarly to steps S20 to S22 in FIG. 5. In step S22, the transmission control unit 36 changes the control signal 126 from the low level to the high level. This causes the transmission circuit 21 to start the output of the transmission signal 121.

Immediately thereafter, the processing proceeds from step S22 to step S40. The period from step S22 to step S40 is the period from when the transmission circuit 21 of the module 32 starts the output of the transmission signal 121 to when the transmission circuit 11 of the module 31 starts the output of the transmission signal 111 at least in a case where the modules 31 and 32 are in proximity to each other.

In step S40, the transmission control unit 36 determines whether the measurement signal 135 is lower than a threshold value B. In a case where the measurement signal 135 is lower than the threshold value B (YES in step S40), the processing proceeds to step S30. On the other hand, the measurement signal 135 is higher than or equal to the threshold value B (NO in step S40), the processing proceeds to step S32.

In this example, the threshold value B is a value that is lower than the measurement signal 135 (i.e., the interference signal intensity) in a state where the modules 31 and 32 are separated from each other, and that is higher than the measurement signal 135 (i.e., the interference signal intensity) in a state where the modules 31 and 32 are in proximity to each other.

The measurement signal 135 being higher than or equal to the threshold value B immediately after the transmission circuit 21 starts the output (i.e., before the transmission circuit 11 of the opposing module 31 starts the output) indicates that the opposing module 31 is separated, i.e., the proximity detection is false.

Thereafter, in steps S30 to S32 and S23, the module 32 performs processing similarly to steps S30 to S32 and S23 in FIG. 5.

While the transmission control unit 36 has been described to perform the operation of maintaining the control signal 126 at the low level before the proximity detection unit 25 detects the separation in a case where the measurement signal 135 is determined to be higher than or equal to the threshold value B in step S40, the transmission control unit 36 is not limited thereto. For example, after determining that the measurement signal 135 is higher than or equal to the threshold value B, the transmission control unit 36 may check the measurement signal 135 at regular intervals while the proximity detection unit 25 detects the proximity, and in a case where the measurement signal 135 has become lower than the threshold value B, the processing may proceed to step S30 and the subsequent steps.

Furthermore, in the present example embodiment, steps S30 and S31 in FIG. 10 may not necessarily be essential and may be skipped.

As described above, the transmission circuit 21 stops the output of the transmission signal 121, which is to be transmitted to the module 31, while the proximity detection unit 25 does not detect the proximity to the module 31. In a case where the proximity detection unit 25 detects the proximity to the module 31, the transmission circuit 21 starts the output of the transmission signal 121 to be transmitted to the module 31. In a case where the signal intensity of the interference signal (the reception signal) 123 that originates from the output of the transmission signal 121 is higher than or equal to the threshold value B before the predetermined time has elapsed in step S30, the transmission circuit 21 stops the output of the transmission signal 121 to be transmitted to the module 31. Furthermore, in a case where the reception intensity of the reception signal 123 received from the module 31 is lower than the threshold value A after the predetermined time has elapsed since the start of the output of the transmission signal 121, the transmission circuit 21 stops the output of the transmission signal 121 to be transmitted to the module 31.

The threshold value B is a value that is lower than the interference signal intensity in a state where the modules 31 and 32 are separated by a distance at which the modules 31 and 32 are not communicable with each other, and that is higher than the interference signal intensity in a state where the modules 31 and 32 are separated by a distance at which the modules 31 and 32 are communicable with each other.

In the present example embodiment, the module 32 stops the output of the transmission signal 121 faster than in the second example embodiment in a case where the detection by the proximity detection unit 25 is false. This further suppresses the module 32 from causing unnecessary power consumption and unnecessary radiation due to false detection.

According to the above-described example embodiments, reduced power consumption and reduced unnecessary radiation are achieved.

OTHER EMBODIMENTS

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)'), a flash memory device, a memory card, and the like.

While example embodiments have been described, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2021-100734, filed Jun. 17, 2021, which is hereby incorporated by reference herein in its entirety.

What is claimed is:

1. A communication apparatus configured to contactlessly communicate a baseband signal to another communication apparatus, the communication apparatus comprising:
    a transmission unit configured to stop outputting a transmission signal while a reception intensity of a reception signal received from the other communication apparatus is lower than a first threshold value, wherein the transmission signal is to be transmitted to the other communication apparatus; and
    a transmission coupler configured to be coupled to a reception coupler of the other communication apparatus by electric field coupling.

2. The communication apparatus according to claim 1, wherein the baseband signal is a signal, between the communication apparatus and the other communication apparatus, into which a known pattern is inserted during an idle period.

3. The communication apparatus according to claim 1, wherein the transmission unit outputs the transmission signal while the reception intensity of the reception signal is higher than or equal to the first threshold value.

4. The communication apparatus according to claim 1, wherein the transmission unit outputs the transmission signal to the transmission coupler.

5. The communication apparatus according to claim 1, wherein the first threshold value is a value that is higher than a signal intensity of the reception signal in a state where the communication apparatus and the other communication apparatus are separated from each other by a distance at which the communication apparatus and the other communication apparatus are not communicable with each other, and that is lower than a signal intensity of the reception signal in a state where the communication apparatus and the other communication apparatus are separated from each other by a distance at which the communication apparatus and the other communication apparatus are communicable with each other.

6. The communication apparatus according to claim 1, further comprising a reception coupler configured to receive the reception signal from the other communication apparatus.

7. The communication apparatus according to claim 1, wherein the baseband signal is a serial gigabit media independent interface (SGMII) signal, a 100BASE-FX signal, or a 1000BASE-X signal.

8. A communication apparatus configured to contactlessly communicate a baseband signal to another communication apparatus, the communication apparatus comprising:
    a proximity detection unit configured to detect proximity to the other communication apparatus; and
    a transmission unit configured to stop outputting a transmission signal while the proximity detection unit does not detect the proximity to the other communication apparatus, and configured to output the transmission signal while the proximity detection unit detects the proximity to the other communication apparatus, wherein the transmission signal is to be transmitted to the other communication apparatus.

9. The communication apparatus according to claim 8, further comprising a transmission coupler,
   wherein the transmission unit outputs the transmission signal to the transmission coupler.

10. The communication apparatus according to claim 8, further comprising a reception coupler configured to receive a reception signal from the other communication apparatus.

11. A method for controlling a communication apparatus configured to contactlessly communicate a baseband signal to another communication apparatus, the method comprising:
   outputting a transmission signal that is to be transmitted to the other communication apparatus; and
   stopping outputting the transmission signal while a reception intensity of a reception signal received from the other communication apparatus is lower than a first threshold value.

12. A method for controlling a communication apparatus configured to contactlessly communicate a baseband signal to another communication apparatus, the method comprising:
   detecting proximity to the other communication apparatus; and
   stopping outputting a transmission signal while the proximity to the other communication apparatus is not detected, and outputting the transmission signal while the proximity to the other communication apparatus is detected, wherein the transmission signal is to be transmitted to the other communication apparatus.

\* \* \* \* \*